United States Patent
Ralph et al.

(10) Patent No.: US 6,771,856 B2
(45) Date of Patent: Aug. 3, 2004

(54) COMPENSATION OF MODAL DISPERSION IN OPTICAL WAVEGUIDES

(75) Inventors: Stephen E. Ralph, Atlanta, GA (US); Ketan Patel, Yardley, PA (US)

(73) Assignee: Georgia Tech Research Corporation, Atlanta, GA (US)

( * ) Notice: Subject to any disclaimer, the term of this patent is extended or adjusted under 35 U.S.C. 154(b) by 128 days.

(21) Appl. No.: 10/061,837

(22) Filed: Feb. 1, 2002

(65) Prior Publication Data

US 2003/0147586 A1 Aug. 7, 2003

(51) Int. Cl.[7] ............................................. G02B 6/26
(52) U.S. Cl. ............................ 385/31; 385/38; 385/27; 250/208.6
(58) Field of Search .......................... 385/15, 27, 31, 385/38; 250/208.6

(56) References Cited

U.S. PATENT DOCUMENTS

| | | | |
|---|---|---|---|
| 3,689,772 A | 9/1972 | George et al. | 250/211 |
| 3,777,150 A | 12/1973 | Miller | 250/209 |
| 3,988,614 A | * 10/1976 | Kapron et al. | 250/227 |
| 4,050,782 A | 9/1977 | Uchida et al. | 350/96 |
| 2001/0036334 A1 | * 11/2001 | Choa | 385/27 |

OTHER PUBLICATIONS

Haas, Z. and Santoro, M.: (Jul. 1993) "A Mode–Filtering Scheme for Improvement of the Bandwidth–Distance Product in Multimode Fiber Systems", *Journal of Lightwave Technology*, vol. 11 (7), pp. 1125–1130.

Pending Application, Serial No.: 10/061,621; Filed Feb. 1, 2002, entitled "Segmented Photodetectors For Detection and Compensation of Modal Dispersion in Optical Waveguide".

Shur, M.S. (1996) "MSM Photodector" drawing, *Introduction to Electronic Devices*, Wiley Publishing.

* cited by examiner

*Primary Examiner*—John D. Lee
*Assistant Examiner*—Sung Pak
(74) *Attorney, Agent, or Firm*—Thomas, Kayden, Horstemeyer & Risley LLP (57) ABSTRACT

Methods for detecting and compensating for multiple optical signals produced in a multi-mode fiber system are provided. A representative method includes detecting a plurality of optical signals radiating from an end of the multi-mode fiber by a multisegment photodetector having different detector regions that detect different portions of the plurality of optical signals, and modifying detected signal by the multisegment photodetector to reduce the affects of modal dispersion among the plurality of optical signals. Other methods also are provided.

27 Claims, 7 Drawing Sheets

COMPENSATION OF MODAL DISPERSION IN OPTICAL WAVEGUIDES

TECHNICAL FIELD

The present invention is generally related to optical fiber systems and, more particularly, is related to systems and methods for detection and compensation of modal dispersion in optical waveguides.

BACKGROUND OF THE INVENTION

In an optical communication system deploying a multi-mode fiber (MMF), an optical signal launched into the fiber propagates along the fiber as multiple modes, each of which exhibits a different group velocity. A portion of the source optical signal resides in the different modes. The multiple modes can have different arrival times at the end of the fiber. The different group velocities of the modes cause a pulse formed from more than one mode to spread out as it propagates, and is referred to as intermodal dispersion which distorts the optical signal. Intermodal dispersion causes the optical signal initially launched through a fiber at a predetermined frequency and an initial phase to vary as a function of the length of the fiber.

Modal dispersion reduces the maximum data transmission rate of the optical communication system and thus diminishes the total transmission capacity of the fiber. This results from the fact that modal dispersion spreads the optical pulse as it propagates. Thus, short pulses are limited to very short transmission distances and longer pulses can be transmitted further since the relative distortion of the pulse is smaller. Since shorter pulses typically require more bandwidth, multimode fiber is characterized by a bandwidth-distance product. Importantly, the bandwidth-distance products of typical multimode fiber are severely limiting. Modem multimode fiber incorporates a graded optical index profile within the core of the fiber to reduce modal dispersion. Unfortunately, modal dispersion remains the dominant bandwidth limiting mechanism in multimode fibers. Furthermore, as compared to single mode fibers, these limits reduce the capacity of multimode fiber by orders of magnitude.

Thus, a heretofore unaddressed need exists in the industry to address the aforementioned and/or other deficiencies and/or inadequacies.

SUMMARY OF THE INVENTION

The present invention provides methods for compensating for modal dispersion in multimode optical communications systems. Briefly described, one embodiment of the invention, among others, can be implemented as follows. The method includes detecting, in a multi-mode fiber optic system having an optical signal coupled into a multi-mode fiber, a plurality of optical signals radiating from an end of the multi-mode fiber by a multisegment photodetector. Typically, the multisegment photodetector has different detector regions that detect different portions of the plurality of optical signals. The method also includes modifying the detected signals to reduce the effects of modal dispersion among the plurality of optical signals.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Disclosed herein are systems and methods that involve detection and compensation of modal dispersion in optical waveguides. To facilitate description of the inventive systems and methods, several example devices and methods that can be used to implement the segmented photodetectors are discussed with reference to the figures. Although systems and methods are described in detail, it will be appreciated that the systems and methods are provided for purposes of illustration only and that various modifications are feasible without departing from the inventive concept. After the example systems have been described, an example of operation of a system will be provided to explain the manner in which the system can be used to provide the method for detection and compensation of modal dispersion in optical communications systems.

Figure 1:
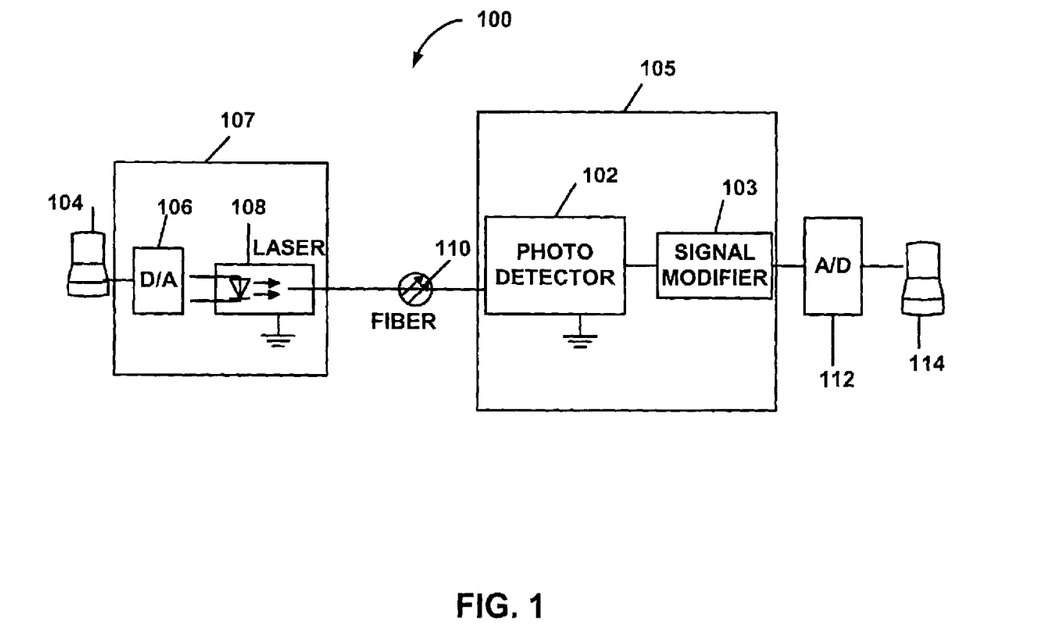
FIG. 1 is a schematic diagram of an optical fiber system including a photodetection system in accordance with an embodiment of this invention.

Referring now in more detail to the drawings, in which like numerals indicate corresponding parts throughout the several views, FIG. 1 is a schematic diagram of an optical fiber system 100 including a photodetector 102, such as a multisegment photodetector, for detection of modal dispersion in an optical fiber system 100 and a signal modifier 103 that compensates for the modal dispersion. The photodetector 102 and signal modifier 103 encompass a photodetection system 105. A typical optical fiber system 100 includes a device 104 adapted to transmit an electrical digital signal, such as a computer but may include other signal types such as analog signal transmission. The digital signal is converted to optical signal by an electrical-to-optical (E-O) converter 107 which may include the use of a digital-to-analog converter 106 and light source, such as a laser 108. The modulation used is typically on-off keying (OOK) but is not limited to OOK and may include other modulation techniques such a multilevel modulation. The light source from the laser 108 launches an optical signal into a multi-mode fiber 110. The optical signal propagates along the fiber 110. As the optical signal propagates in the fiber 110, multiple modes of light are formed with many travelling through the fiber 110 at different velocities. Typical, but not inclusive, wavelengths in which laser 108 operates includes 850 nanometers (nm) and/or 1300 nm. A suitable laser includes a vertical cavity surface emitting laser (VCSEL) that is well known in the art, but may also include light emitting diodes (LED), distributed feedback (DFB) laser or Fabry-Perot (F-P) lasers.

Positioned at the end of the fiber 110 is the photodetection system 105. Multiple modes of light exiting from the fiber 110 enter the multisegment photodetector 102. The multisegment photodetector 102, either with the use of varying biases to alter (relative to each other) the individual electrical signal of each multiple segment or separate signal modifier 103, the plurality of detected signals are altered and combined into one electrical output. The multisegment photodetector 102 outputs an electrical signal that, if converted to an optical signal, is substantially similar to the originally transmitted optical signal launched from the laser 108 into the fiber 110. It may be possible to implement any necessary alteration, or weighting factor, to the plurality of detected signal by the use of appropriate bias among the plurality of detection regions. However, external signal modifier 103 may be used to adjust the signal as necessary. The selection of weighting factors is chosen to reduce differences between the various modes. Moreover, weighting factors can be fixed or adjustable. This external signal modifier 103 can include electronic or mechanical devices such as attenuators, delay lines, amplifiers, and/or phase shifter. The output signal of the photodetection system 105 is then converted using an analog-to-digital converter 112 and then transmitted to a device that uses the digital signal, such as a computer 114.

Figure 2:
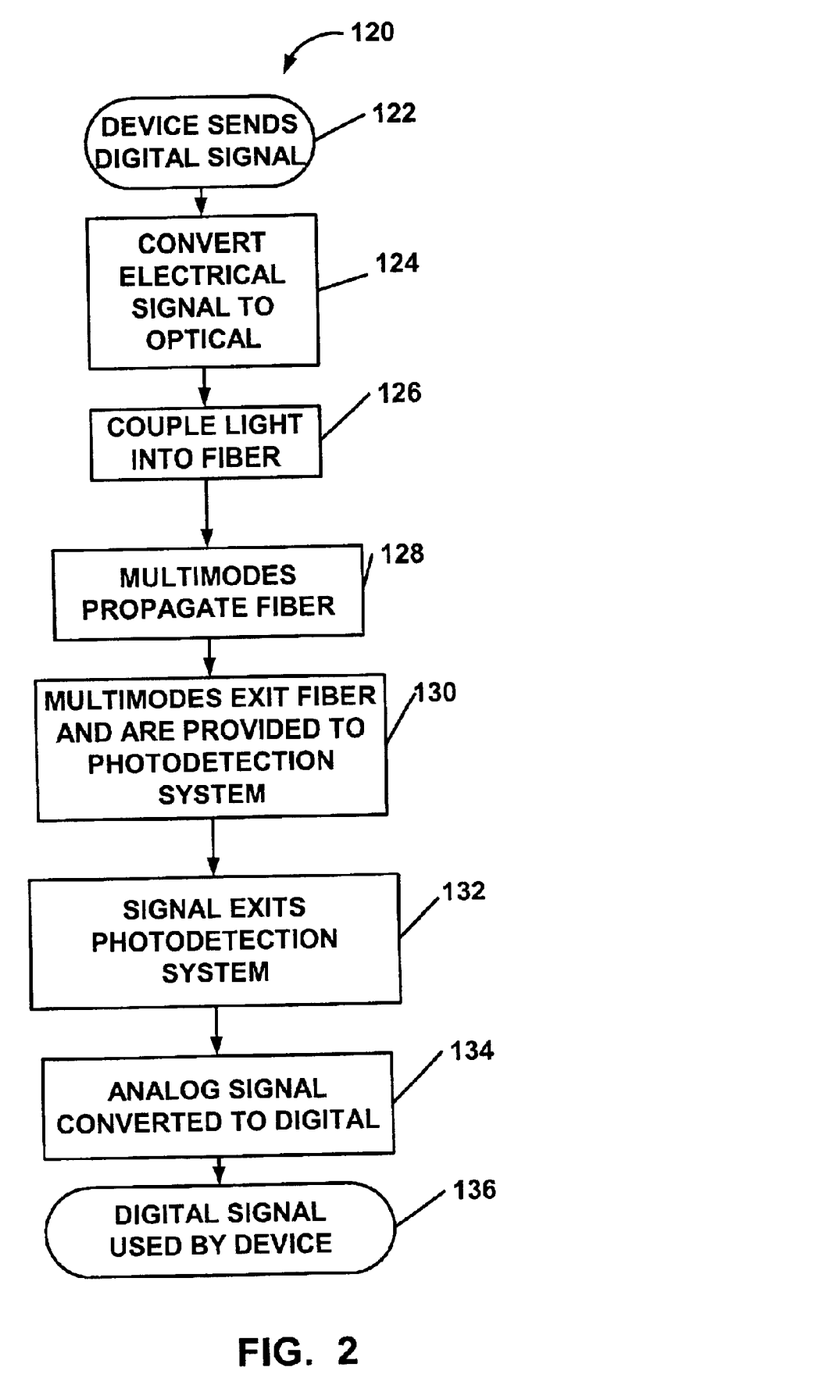
FIG. 2 is a flow chart depicting functionality or operation of the optical fiber system of FIG. 1.

FIG. 2 shows a flow chart 120 of processes encompassed by the optical fiber system 100 of FIG. 1. At 122, a device, such as a computer, sends a digital signal. At 124, the digital signal is converted to an optical signal using an digital-to-analog converter and laser. At 126, the optical signal is coupled into the fiber. At 128, the light propagates along the multi-mode fiber as various propagating modes, each traveling at a different velocity. At 130, the various propagating modes exit the fiber and encounter the photodetection system which converts the optical signal to multiple electrical signals. The electrical signals then can be modified accordingly and are combined. At 132, an electrical signal exits the photodetection system. At 134, the signal is converted from analog to digital by the analog-to-digital converter. At 136, the digital signal is used by a device, such as the computer shown in FIG. 1.

Figure 3:
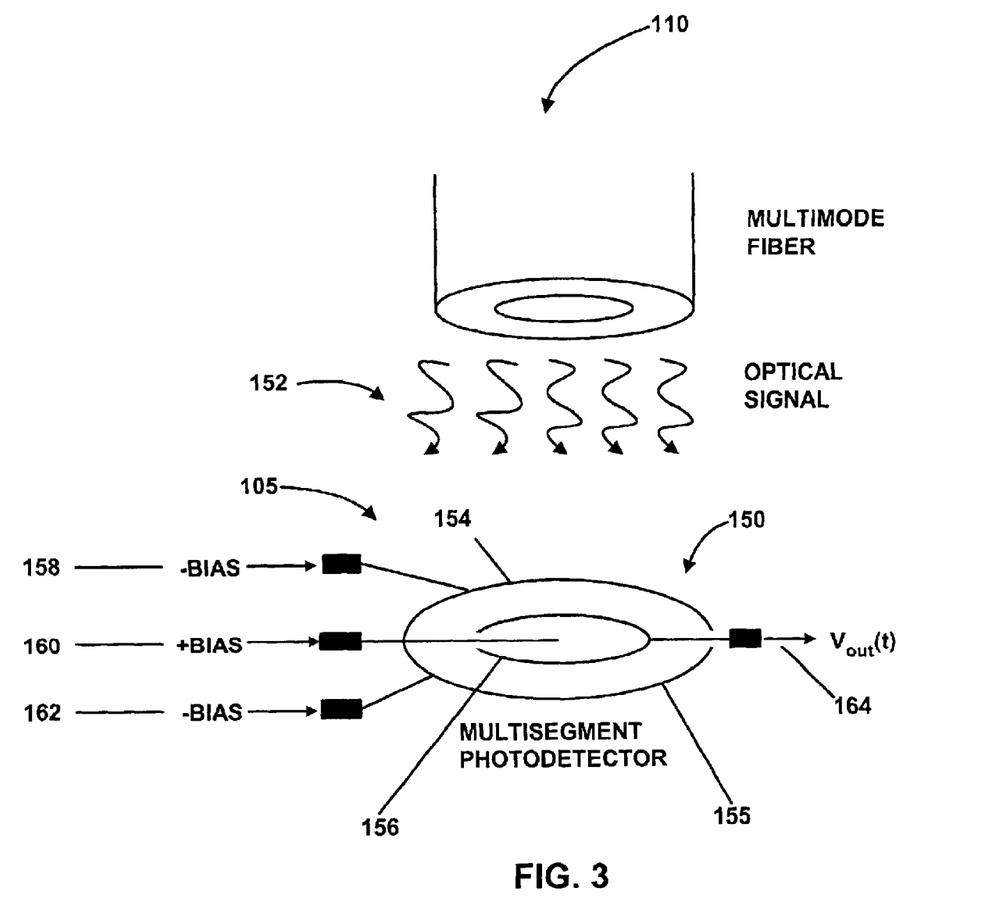
FIG. 3 is a schematic diagram of an embodiment of a photodetection system for use with the optical fiber system FIG. 1.

FIG. 3 is a schematic diagram of an embodiment of a photodetection system 105 that could be used with the optical fiber system 100 of FIG. 1. The photodetection system 105 includes one embodiment of a multisegment photodetector 150. The multisegment photodetector 150 receives a plurality of optical signals 152 exiting the multimode fiber 110. The multisegment photodetector 150 may be shaped and arranged in a number of arbitrary manners. FIG. 3 shows an example of a multisegment photodetector 150 having coplanar, annular detector segments 154, 155, and 156. The invention is not limited to using coplanar, annular photodetection segments and may be used with non-planar, non-annular or non-concentric photodetector segments.

For instance, the photodetector can include segments located within detection zones that have an interdigitated structure. In one embodiment, the multisegment photodetector 150 is a metal-semiconductor-metal (MSM) type multisegment photodetector. In an alternative embodiment, the multisegment photodetector 150 includes other detection technology, as appropriate, taking into consideration impulse response, photoconversion efficiency and fabrication. This may include, but not limited to, diodes such as PIN, as well as materials such as silicon.

The multisegment photodetector 150 is not limited to the number of detector segments shown in the configuration of FIG. 3. Each individual detector of the multisegment photodetector 150 detects the plurality of optical signals 152 (also referred to as modes) differently according to each detector's position relative to the multi-mode fiber 110.

In FIG. 3, an example of a mechanism for adjusting the signals 152 is shown. The optical signals 152 carry a portion of the original optical signal launched in the fiber 110 by the laser 108 and a portion of interference optical modes caused by modal dispersion. Generally, a geometric configuration of the detector segments 154, 155 and 156 provides for isolating an optical signal 152, wherein the isolated signal is a combination of the original optical signal and interference signals generated from the multiple modes. The example of FIG. 3 shows three segments that receive bias 158, 160, and 162. For instance, segment 156 detects a combination of modes having the strongest portion of the original optical signal plus a moderately strong interference signal. This segment is positively biased 160 producing no change in the polarity of the mode.

Segment 155 detects a combination of modes having a weak portion of the original optical signal and a stronger interference signal. This segment is negatively biased 158 causing a change in polarity and producing a weak negative value for the original optical signal and a stronger negative value interference signal. Segment 154 detects a combination of modes having a weak portion of the original optical signal and a stronger interference signal. This segment is negative biased 162 causing a change in polarity and producing a weak negative value for the original optical signal and a stronger negative value interference signal. Combining these signals causes a cancellation of the interference signals and produces the output signal that closely approximated the optical signal originally launched into the fiber 110.

Bias 158, 160, and 162, such as a voltage, applied across the coplanar, annular segments 154, 155 and 156 of the multisegment photodetector 150 modifies the signals produced from the multisegment photodetector 150 and assist in the direction and flow of electrons producing an output, such as voltage $V_{out}(t)$ 164.

The biasing 158, 160 and 162 shown in FIG. 3 is a specific example of a weighting factor. The signals are weighted and their polarity is changed by bias to negative, positive, negative, 158, 160, and 162, respectively. When summed, the detected signals result in an output that can closely approximate the original optical signal coupled into the fiber 110.

In one embodiment, the modification made to the individually detected signal is by the use of differing bias magnitude and polarity of each photodetection zone. In an alternative embodiment, the modification is achieved by any combination of electrical and mechanical instruments used to impart changes in amplitude and/or phase to the electrical signal.

Additionally, a number of diffractive or reflective optical elements may be positioned between the multi-mode fiber 110 and the multisegment photodetector 150.

Figure 4:
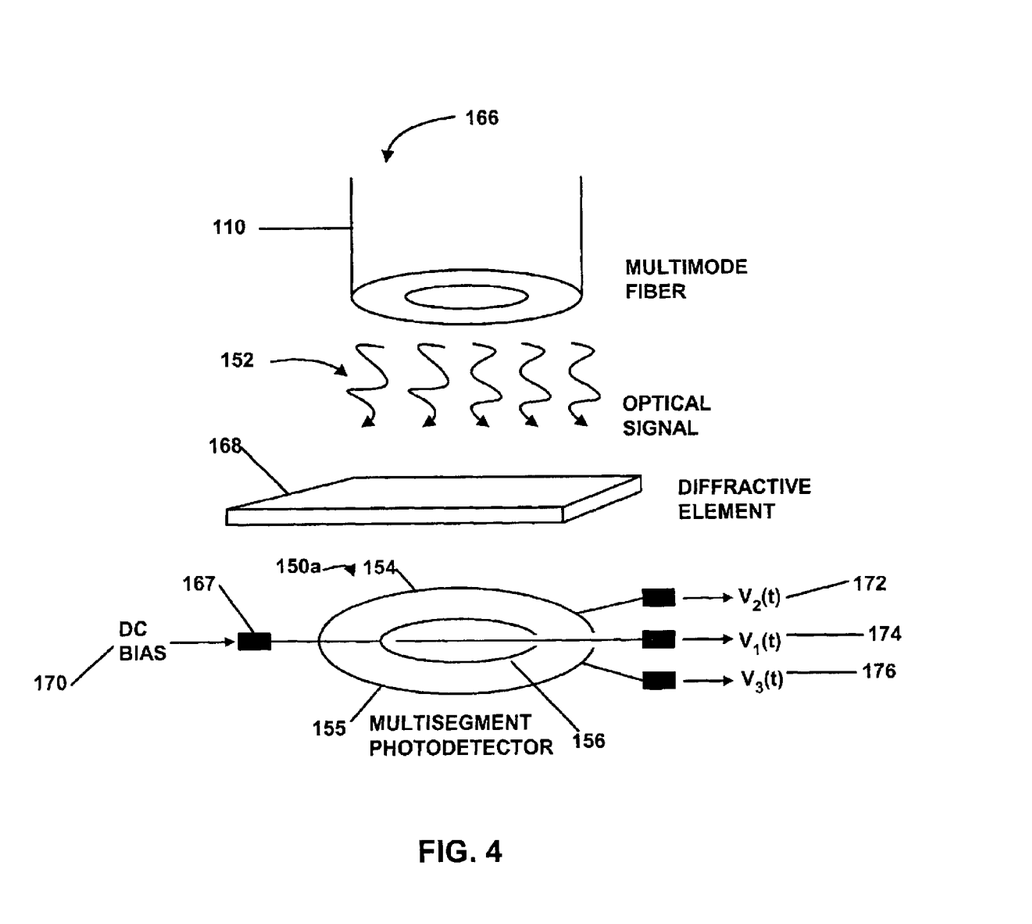
FIG. 4 is a schematic diagram of an alternative embodiment of a photodetection system for use with the optical fiber system FIG. 1.

FIG. 4 shows a schematic diagram 166 of an alternative embodiment of a photodetection system for use with the optical fiber system of FIG. 1. The photodetection system includes a multisegment photodetector 150a that receives a plurality of optical signals 152 from a multi-mode fiber 110. A number of diffractive or reflective optical elements may be positioned between the multi-mode fiber 110 and the multisegment photodetector 150*a*, as shown. For instance, a diffractive element 168 between the multisegment photodetector 150*a* and the multi-mode fiber 110 refocuses the optical signals 152 in a specific manner before the optical signals 152 enter the multisegment photodetector 150*a*. The intervening optical elements can include, but are not limited to, lenses, mirrors and/or holographic elements. The detector segment in this embodiment receives identical biases, and thus requires an additional, external means of applying the desired weighting factors required for compensation for modal dispersion.

Figure 5:
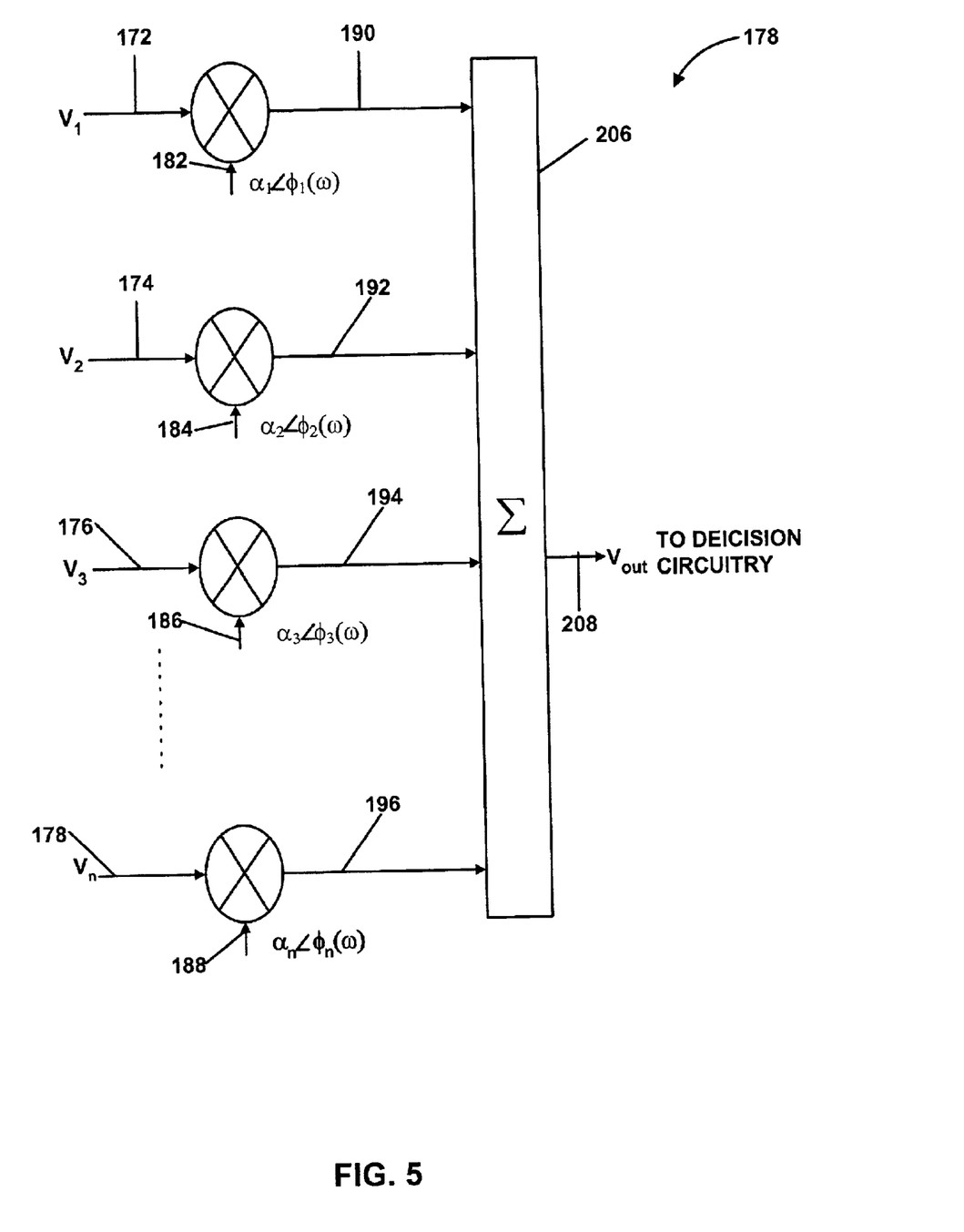
FIG. 5 is a schematic diagram of an embodiment of a configuration used to modify the signals from a multisegment photodetector of FIG. 1.

FIG. 5 is a schematic diagram of one embodiment of a configuration 178 used to modify the signals from the multisegment photodetector 150, 150*a* of FIG. 3 and/or FIG. 4. Signals ($V_1$, $V_2$, $V_3$ to $V_n$, 172, 174, 176 and 180, respectively) can be modified by weighting factors as discussed above, including incorporating bias, attenuation, amplification and delay. For illustrative purposes, signals 172, 174, 176 and 180 experience an arbitrary vector scaling factor 182, 184, 186, and 188 as shown in FIG. 5. The signals 172, 174, 176 and 180 may be subjected to another weighting factor or a combination of weighting factors. Interim outputs 190, 192, 194 and 196 are summed 206 to produce an output signal 208 that, if an equivalent optical signal, closely approximates the optical signal 108 originally coupled into the fiber 110. The output signal 208 can be used in a variety of manners including converting the signal to digital using an analog-to-digital converter 112 and then providing the signal to a device such as a computer 114 for use in a user's application.

Figure 6A:
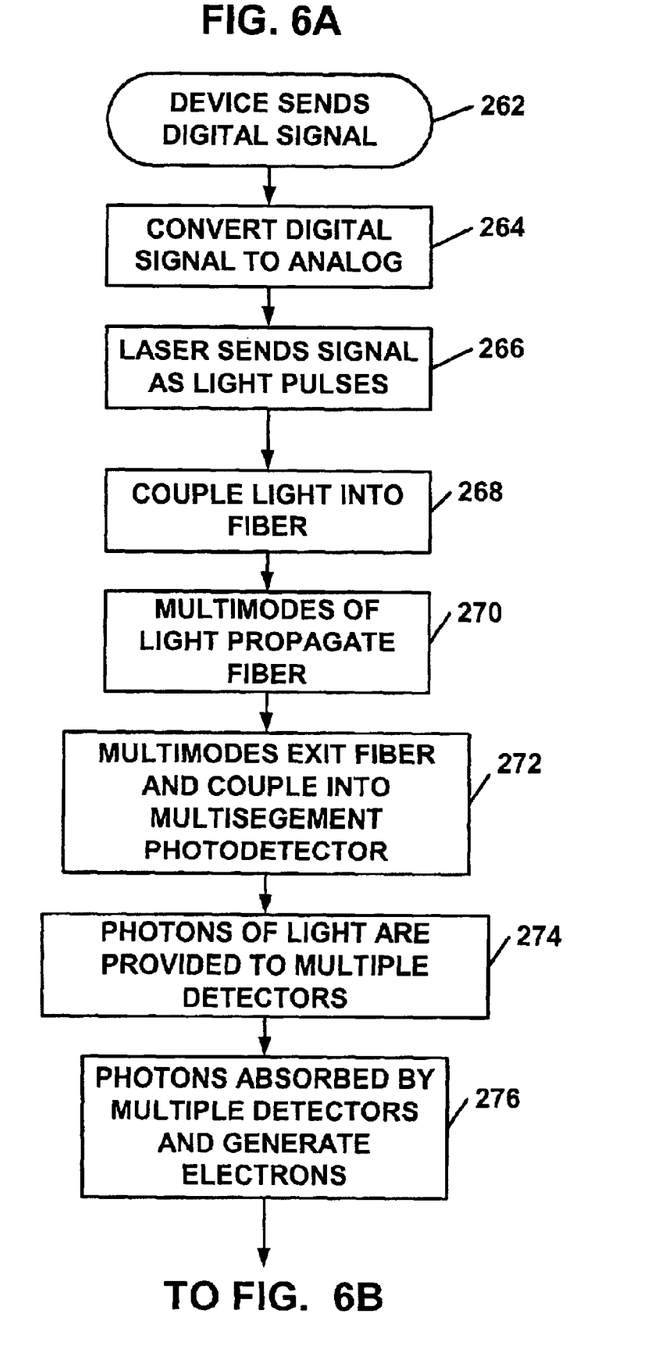
FIGS. 6A and 6B are flow charts depicting functionality or operation of the optical fiber system of FIG. 1.
Figure 6B:
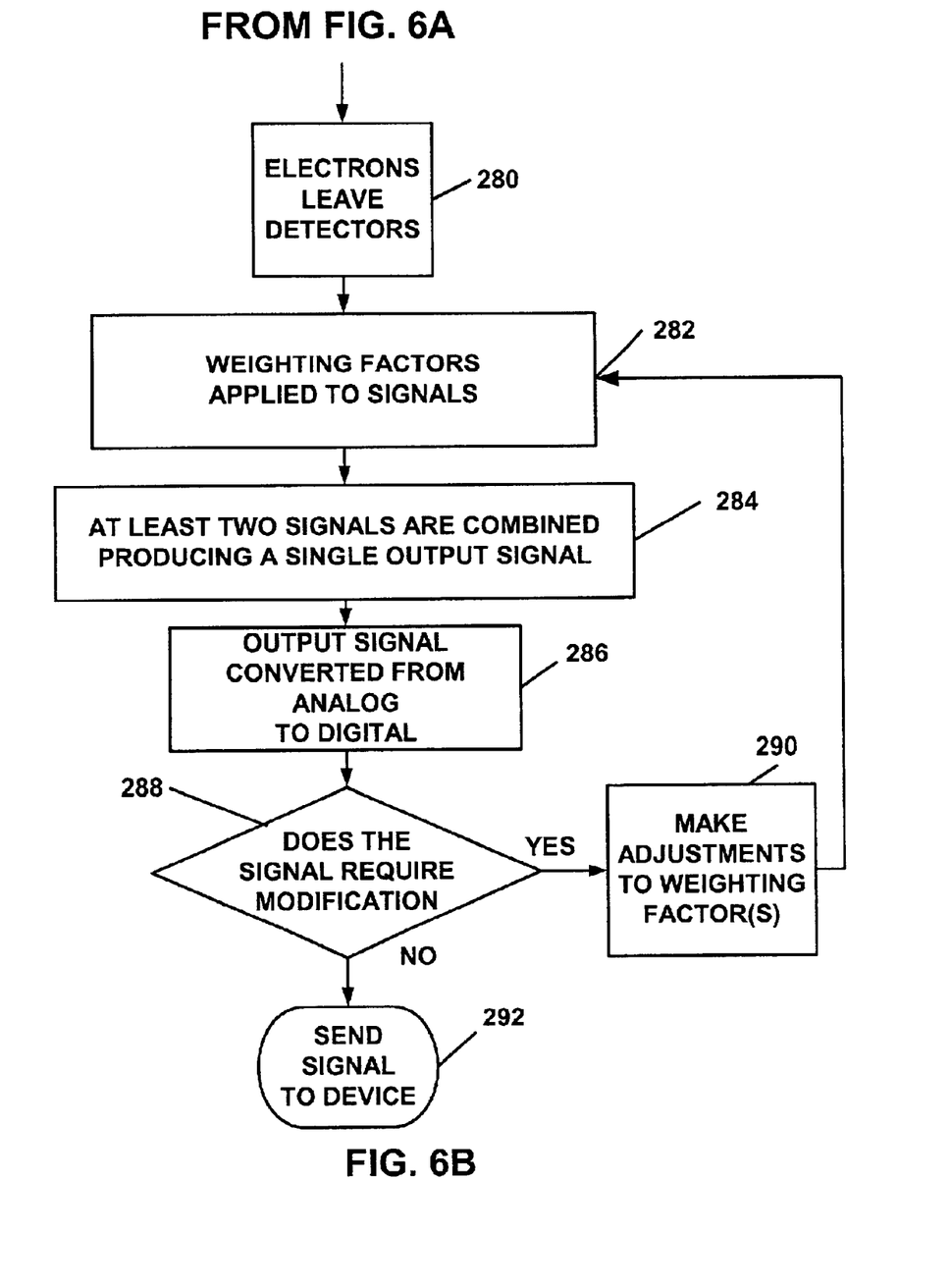

FIGS. 6A and 6B are flow charts depicting functionality or operation of the optical fiber system of FIG. 1. Referring to FIG. 6A, at 262, a device such as a computer sends a digital signal. At 264, the digital signal is converted to an analog signal for use in the optical fiber system. At 266, a laser sends the signal as light pulses. At 268 the light is coupled into a multi-mode fiber. The light radiates as multiple modes, and at 270, the multiple modes of light propagate the fiber. The multiple modes of light exit the fiber at 272 and couple into the multisegment photodetector. Alternatively, the multiple modes of light enter a diffraction element positioned between the multi-mode fiber and the multisegment photodetector. At 274, the photons of light hit the multiple detectors of the multisegment photodetector. At 276, the photons are absorbed by the multiple detectors and generate electrons that can be used as a current or converted to voltage.

Referring to FIG. 6B, at 280 the electrons leave the multiple detectors. At 282, signal(s) enter a weighting factor that modifies the signal. At 284, in a system having at least two modified signals, the modified signals are combined producing an output signal. At 286, the output signal is converted from analog to digital. It may be determined either during real-time use of the optical network or before such as during a "training session" that adjustments must be made on the modification made upon the plurality of signals. In this event, the error in the output signal is computed, either by comparison to a known copy of the transmitted signal or some other error estimating algorithm, and the weighting factors used in step 282 are altered at 290, such that the error is minimized as necessary. This process may be iterative according to the algorithm used at 290. At 292, the signal is sent to a device such as a computer for use in a user's application.

A potential advantage of the present invention is that it accepts the effects of the multi-modes exiting the fiber and uses inventive photodetection systems and methods to determine the effect of differential mode delay and compensate for and reduce the effect of the modal delays. The result is an output signal that can closely approximate the original signal coupled into the fiber.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. For example, the weighting factors as discussed above may be arbitrarily chosen or may be set by a "training" process. During the training process a known signal is sent through the multisegment photodetector and the weighting factors are adjusted until the output matches the transmitted signal. This "training" may be performed as needed to correct for modal dispersion. The matching process may be performed manually or by an electronic feedback mechanism. All such modifications and variations are intended to be included herein within the scope of this disclosure and the present invention and protected by the following claims.

Therefore, having thus described the invention, at least the following is claimed:

1. A method for detecting and correcting for modal dispersion in a multi-mode fiber optic system having an optical signal coupled into a multi-mode fiber, comprising:
    detecting a plurality of optical signals radiating from an end of the multi-mode fiber by a multisegment photodetector having different detector regions that detect different portions of the plurality of optical signals; and
    modifying detected signals in the multisegment photodetector to reduce effects of modal dispersion among the plurality of optical signals.

2. The method of claim 1, wherein modifying detected signals in the multisegment photodetector is performed using weighting factors that adjust the detected signals.

3. The method of claim 1, wherein modifying detected signals in the multisegment photodetector comprises modifying at least one detected signal by a weighting factor to produce an output optical signal that approximates the optical signal originally coupled into the multi-mode fiber.

4. The method of claim 1, wherein modifying detected signals in the multisegment photodetector is performed by altering at least one bias among the multiple detection regions, the at least one bias representing at least one weighting factor.

5. The method of claim 1, wherein modifying detected signals in the multisegment photodetector is performed by an attenuation of at least one signal, wherein the attenuation represents at least one weighting factor.

6. The method of claim 1, wherein modifying detected signals in the multisegment photodetector is performed by an amplification of at least one signal, wherein the amplification represents at least one weighting factor.

7. The method of claim 1, wherein modifying detected signals in the multisegment photodetector is performed by a phase shifting of at least one signal, wherein the phase shifting represents at least one weighting factor.

8. The method of claim 1, wherein modifying detected signals in the multisegment photodetector is performed by applying a delay of at least one signal, wherein the delay represents at least one weighting factor.

9. The method of claim 1, wherein modifying detected signals in the multisegment photodetector comprises examining an output optical signal of the fiber optic system, and adjusting a weighting factor that is applied in the multisegment photodetector to at least one of the detected signals until the output optical signal approximates the optical signal coupled into the multi-mode fiber.

10. The method of claim 1, wherein the multisegment photodetector comprises at least two concentric, coplanar, annular photodetectors.

11. The method of claim 1, wherein detecting a plurality of optical signals radiating from an end of the multi-mode fiber further comprises inserting a diffractive optical element between the fiber and the multisegment photodetector for modifying the distribution of optical signals among the plurality of detection regions.

12. The method of claim 1, wherein detecting a plurality of optical signals radiating from an end of the multi-mode fiber further comprises inserting a reflective optical elements between the fiber and the multisegment photodetector to modify the distribution of optical signals among the plurality of detection regions.

13. A method for detection and compensation of multi-modes produced from a multimode optical fiber system, comprising:

converting an input electrical signal to an optical signal;

transmitting the optical signal into a multimode fiber;

positioning a photodetection system at an end of the multimode fiber to receive a plurality of optical signals exiting the multimode fiber;

detecting the multiple optical signals by multiple detectors of the photodetection system, the multiple detectors incorporating a weighting during detection to produce a plurality of detected electrical signals; and adding together the detected electrical signals to generate an output electrical signal corresponding to the input electrical signal.

14. The method of claim 13, further comprising: transmitting the optical signal using an optical source selected from the group consisting of VCSEL, LED, DFB, and F-P lasers.

15. The method of claim 14, wherein the transmitting comprises transmitting the optical signal by direct modulation.

16. The method of claim 14, wherein the transmitting comprises transmitting the optical signal by indirect modulation.

17. The method of claim 13, further comprising boosting of the optical signal using optical amplification in any part of the multimode optical fiber system.

18. The method of claim 13, further comprising transmitting the optical signal at any combination of wavelengths selected from the group consisting of 850, 1300, and 1550 nm and neighboring wavelengths.

19. The method of claim 13, further comprising inserting an intervening optical element between the fiber and photodetection system to alter the distribution optical light to the plurality of detection zones.

20. The method of claim 13, wherein the weighting produces a delay in at least one of the detected electrical signals.

21. The method of claim 13, wherein the weighting produces an attenuation in at least one of the detected electrical signals.

22. The method of claim 13, wherein incorporating a weighting comprises biasing at least one of the multiple detectors.

23. The method of claim 13, wherein the weighting produces an amplification in at least one of the detected electrical signals.

24. The method of claim 13, wherein the weighting produces a phase shift in at least one of the detected electrical signals.

25. A method for detecting and correcting for dispersion in an optical fiber system, comprising:

detecting optical signals radiating from an end of an optical fiber by a multisegment photodetector having a plurality of detection zones wherein the multisegment photodetector includes a weighting system for detecting the optical signals, the detection zones positioned adjacent to one another and arranged in a coplanar, annular configuration.

26. A system for detecting and correcting the effects of modal dispersion in a multi-mode fiber optic system, the system comprising:

a multi-mode fiber; and a multisegment photodetector configured to receive an optical signal from the multi-mode fiber and produce a plurality of output electrical signals, wherein at least one segment of the multisegment photodetector includes a weighting system to modify at least one of the plurality of output electrical signals, and wherein the weighting system comprises a voltage bias applied to the at least one segment of the multisegment photodetector.

27. The system of claim 26, wherein the voltage bias is positive to amplify a first signal of the plurality of output electrical signals, and negative to attenuate the first signal of the plurality of output electrical signals.

* * * * *

UNITED STATES PATENT AND TRADEMARK OFFICE
CERTIFICATE OF CORRECTION

PATENT NO. : 6,771,856 B2
DATED : August 3, 2004
INVENTOR(S) : Ralph et al.

It is certified that error appears in the above-identified patent and that said Letters Patent is hereby corrected as shown below:

Title page,
Item [57], ABSTRACT, please replace with the following:
-- Methods for detecting and compensating for multiple optical signals produced in a multi-mode fiber system are provided. A representative method includes detecting a plurality of optical signals radiating from an end of the multi-mode fiber by a multisegment photodetector having different detector regions that detect different portions of the plurality of optical signals, and modifying detected signal in the multisegment photodetector to reduce effects of modal dispersion among the plurality of optical signals. Other methods also are provided. --

Signed and Sealed this

Eighth Day of February, 2005

JON W. DUDAS
*Director of the United States Patent and Trademark Office*